United States Patent
Jackson et al.

(10) Patent No.: US 12,065,382 B2
(45) Date of Patent: *Aug. 20, 2024

(54) ENVIRONMENTAL BARRIER COATING

(71) Applicant: RTX CORPORATION, Farmington, CT (US)

(72) Inventors: Richard Wesley Jackson, Mystic, CT (US); James T. Beals, West Hartford, CT (US); Xia Tang, West Hartford, CT (US); David A. Litton, West Hartford, CT (US); Elisa M. Zaleski, Vernon, CT (US); Brian T. Hazel, Avon, CT (US)

(73) Assignee: RTX Corporation, Farmington, CT (US)

( * ) Notice: Subject to any disclaimer, the term of this patent is extended or adjusted under 35 U.S.C. 154(b) by 631 days.

This patent is subject to a terminal disclaimer.

(21) Appl. No.: 17/314,670

(22) Filed: May 7, 2021

(65) Prior Publication Data
US 2022/0356119 A1    Nov. 10, 2022

(51) Int. Cl.
| | |
|---|---|
| C04B 35/48 | (2006.01) |
| C04B 35/622 | (2006.01) |
| C04B 41/00 | (2006.01) |
| C04B 41/45 | (2006.01) |
| C04B 41/50 | (2006.01) |
| C04B 41/87 | (2006.01) |
| C23C 4/04 | (2006.01) |
| C23C 4/10 | (2016.01) |
| C23C 4/134 | (2016.01) |

(52) U.S. Cl.
CPC .......... *C04B 35/481* (2013.01); *C04B 41/009* (2013.01); *C04B 41/4543* (2013.01); *C04B 41/5044* (2013.01); *C04B 41/87* (2013.01); *C23C 4/10* (2013.01); *C23C 4/134* (2016.01); *C04B 2235/3248* (2013.01); *C04B 2235/3427* (2013.01); *C04B 2235/9669* (2013.01)

(58) Field of Classification Search
None
See application file for complete search history.

(56) References Cited

U.S. PATENT DOCUMENTS

| | | |
|---|---|---|
| 6,730,422 B2 | 5/2004 | Litton et al. |
| 9,133,541 B2 | 9/2015 | Lee |
| 9,194,242 B2 | 11/2015 | Lee |
| 9,328,028 B2 | 5/2016 | Lane et al. |

(Continued)

FOREIGN PATENT DOCUMENTS

| | | |
|---|---|---|
| EP | 3611147 | 2/2020 |
| WO | 2004039750 | 5/2004 |

OTHER PUBLICATIONS

European Search Report for European Patent Application No. 22169441.7 dated Sep. 23, 2022.

*Primary Examiner* — David Sample
(74) *Attorney, Agent, or Firm* — Carlson, Gaskey & Olds, P.C.

(57) ABSTRACT

An environmental barrier coating includes a barrier layer which includes a matrix, diffusive particles, and gettering particles; and a calcium-magnesia alumina-silicate (CMAS)-resistant component. The CMAS-resistant component includes hafnium silicate and a rare earth hafnate. An article and a method of fabricating an article are also disclosed.

17 Claims, 4 Drawing Sheets

(56) References Cited

U.S. PATENT DOCUMENTS

| | | |
|---|---|---|
| 2005/0249977 A1 | 11/2005 | Hisamatsu et al. |
| 2014/0272197 A1 | 9/2014 | Lee |
| 2016/0332922 A1* | 11/2016 | Tang .................... C23C 28/044 |
| 2021/0040003 A1 | 2/2021 | Smyth et al. |
| 2021/0054749 A1 | 2/2021 | Jackson et al. |
| 2021/0070666 A1 | 3/2021 | Jackson et al. |

* cited by examiner

ENVIRONMENTAL BARRIER COATING

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

This disclosure relates to composite articles, such as those used in gas turbine engines. Components, such as gas turbine engine components, may be subjected to high temperatures, corrosive and oxidative conditions, and elevated stress levels. In order to improve stability, the component may include a protective environmental barrier coating.

SUMMARY

An environmental barrier coating according to an exemplary embodiment of this disclosure, among other possible things includes a barrier layer with a matrix, diffusive particles, and gettering particles, and a calcium-magnesia alumina-silicate (CMAS)-resistant component. The CMAS-resistant component includes hafnium silicate and a rare earth hafnate.

In a further example of the foregoing, the rare earth hafnate is La-hafnate, Nd-hafnate or Pr-hafnate.

In a further example of any of the foregoing, the CMAS-resistant layer includes a glass component.

In a further example of any of the foregoing, the CMAS-resistant component includes at least 20 mole percent rare earth metal cations.

In a further example of any of the foregoing, the rare earth hafnate is selected such that when the solubility limit of the rare earth hafnate in monoclinic hafnia is exceeded, a pyrochlore phase is formed.

In a further example of any of the foregoing, the CMAS-resistant component further includes hafnia.

In a further example of any of the foregoing, the CMAS-resistant component includes about 40 single cation mole percent hafnium oxide, about 20 single cation mole percent hafnium silicate, and about 40 single cation mole percent rare-earth hafnate.

In a further example of any of the foregoing, the CMAS-resistant component includes between about 60 and about 90 single cation mole percent hafnium silicate, between about 5 and about 40 single cation mole percent rare-earth hafnate, and up to about 5 single cation mole percent hafnium oxide.

In a further example of any of the foregoing, the CMAS-resistant component includes between about 5 and about 20 single cation mole percent hafnium silicate, between about 40 and about 90 single cation mole percent rare-earth hafnate, and up to about 5 single cation mole percent hafnium oxide.

An article according to an exemplary embodiment of this disclosure, among other possible things includes a substrate and a coating disposed on the substrate. The coating includes a barrier layer. The barrier layer includes a matrix, diffusive particles, and gettering particles. The article also includes a CMAS-resistant component, the CMAS-resistant component including a mixture of hafnium silicate and a rare-earth hafnate. The CMAS-resistant component includes at least 20 mole percent rare earth hafnate.

In a further example of any of the foregoing, the rare earth hafnate is La-hafnate, Nd-hafnate or Pr-hafnate.

In a further example of any of the foregoing, the substrate is a CMC-based material.

In a further example of any of the foregoing, a ratio of a coefficient of thermal expansion of the CMAS-resistant component and a coefficient of thermal expansion of the substrate is between about 0.95 to about 1.6.

In a further example of any of the foregoing, the rare earth hafnate is selected to favor formation of a fluorite phase.

In a further example of any of the foregoing, the CMAS-resistant component includes about 40 single cation mole percent hafnium oxide, about 20 single cation mole percent hafnium silicate, and about 40 single cation mole percent rare-earth hafnate.

In a further example of any of the foregoing, the CMAS-resistant component includes between about 60 and about 90 single cation mole percent hafnium silicate, between about 5 and about 40 single cation mole percent rare-earth hafnate, and up to about 5 single cation mole percent hafnium oxide.

In a further example of any of the foregoing, the CMAS-resistant component includes between about 5 and about 20 single cation mole percent hafnium silicate, between about 40 and about 90 single cation mole percent rare-earth hafnate, and up to about 5 single cation mole percent hafnium oxide.

A method of fabricating an article according to an exemplary embodiment of this disclosure, among other possible things includes applying a barrier layer on a substrate. The barrier layer includes a matrix, diffusive particles, gettering particles, and a CMAS-resistant component. The CMAS-resistant component includes hafnium silicate and a rare earth hafnate.

In a further example of any of the foregoing, the rare earth hafnate is La-hafnate, Nd-hafnate or Pr-hafnate.

In a further example of any of the foregoing, the applying is by thermal spray.

DETAILED DESCRIPTION

Figure 1:
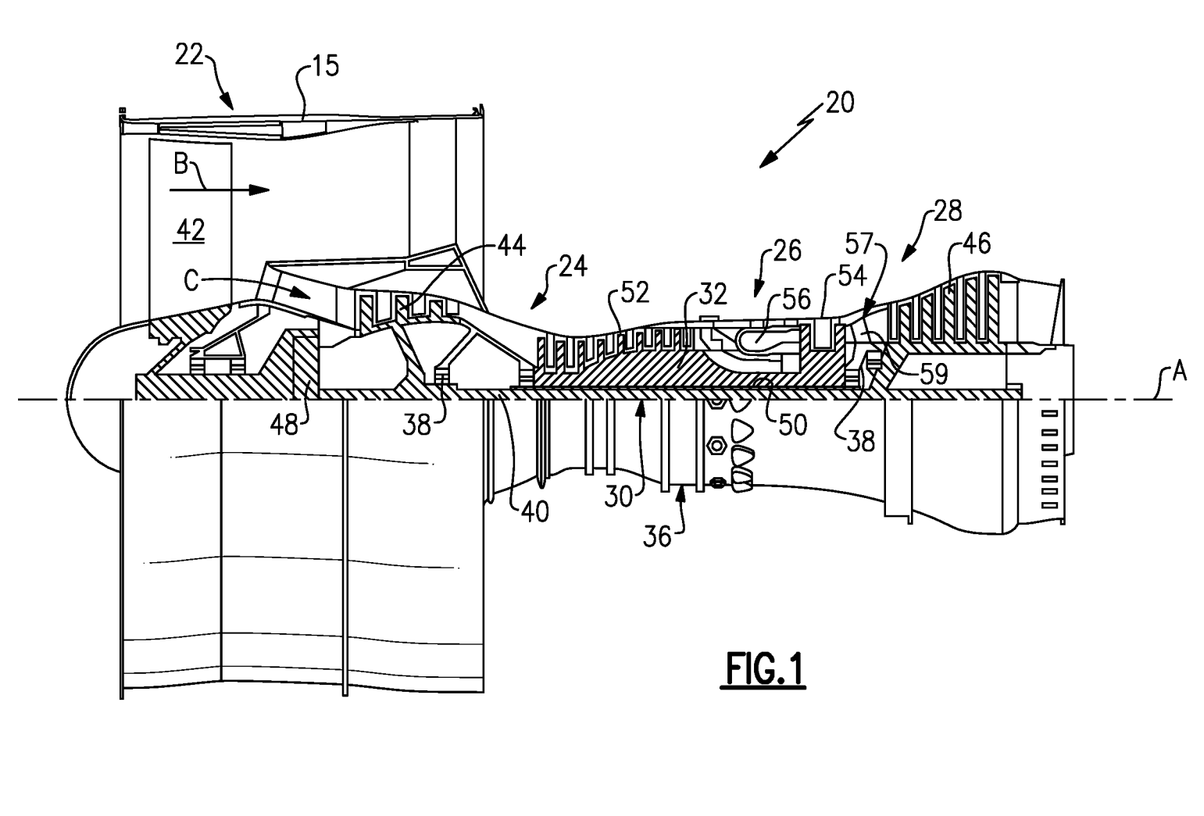
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Components in gas-turbine engines such as the engine 20 can be susceptible to attack by silicate-based deposits such as calcium-magnesium-alumino-silicate (CMAS) that can deposit on the surface of the components. During operation of the engine 20, silicate-based debris (e.g., sand, ash, dirt, etc.) can melt to component surfaces and subsequently form CMAS. The CMAS deposits can be molten at times, and can react with and/or wick into the component or coatings on the component, which can cause damage the component/coating. As will be discussed below, the durability of these engine components can be increased by including coatings which have CMAS-resistant components that can reduce the activity of CMAS. For example, the CMAS-resistant components can include one or more constituents that are reactive with respect to CMAS to form a compound that seals the surface of the component/coating in a process known an "reactive crystallization."

Figure 2:
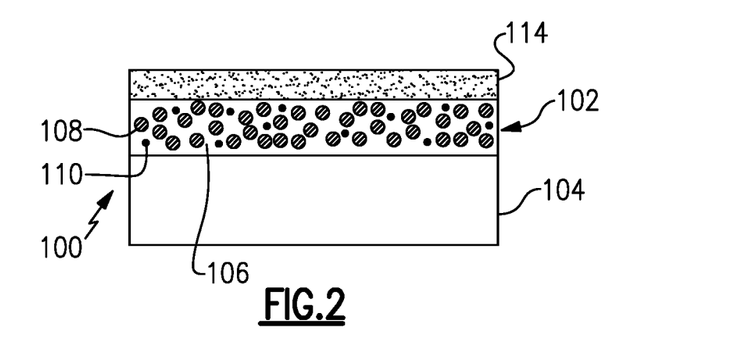
FIG. 2 illustrates an example article having a barrier layer and a CMAS-resistant component.

FIG. 2 schematically illustrates a representative portion of an example article 100 for the gas turbine engine 20 that includes a barrier layer 102 and a calcium-magnesia alumina-silicate (CMAS)-resistant component 114. The article 100 can be, for example, an airfoil in the compressor section 24 or turbine section 28, a combustor liner panel in the combustor section 26, a blade outer air seal, or other component that would benefit from the examples herein. In this example, the barrier layer 102 is used as an environmental barrier layer to protect an underlying substrate 104 from environmental conditions, and in some cases thermal conditions. As will be appreciated, the barrier layer 102 can be used as a stand-alone barrier layer, as an outermost/top coat with additional underlying layers, or in combination with other coating under-layers.

The barrier layer 102 includes a matrix 106, a dispersion of "gettering" particles 108, and a dispersion of "diffusive" particles 110. The matrix 106 can be, in one example, silicon dioxide ($SiO_2$). Other possible matrices 106 include other silicates such as silicate glasses, partially crystalline glasses or crystalline silicates such as rare earth silicates. The barrier layer 102 protects the underlying substrate 104 from oxygen and water, primarily in the form of steam. For example, the substrate 104 can be a ceramic-based substrate, such as a silicon-containing ceramic material. One example is silicon carbide (SiC). A further example is a ceramic matrix composite ("CMC") material, which includes a ceramic matrix with a ceramic phase dispersed in the matrix. One example CMC material has a silicon carbide (SiC) matrix with an SiC phase dispersed in the matrix.

The gettering particles 108 and the diffusive particles 110 of the barrier layer 102 function as an oxygen and steam diffusion barrier to limit the exposure of the underlying substrate 104 to oxygen and/or steam from the surrounding environment. The gettering particles 108 are reactive with respect to oxidants and/or water and mitigate oxidants and/or water from diffusing through the barrier layer. The gettering particles 108 are reactive with respect to oxidant particles and/or water, which could diffuse into the barrier layer. In this way, the gettering particles 108 could reduce the likelihood of those oxidant particles/water from reaching and oxidizing the substrate 104. The gettering particles 108 have a diameter between about 1 and 75 microns. The gettering particles 108 can include a mixture of one or more types of particles. Without being bound by any particular theory, the diffusive particles 110 enhance oxidation and steam protection by diffusing to the outer surface of the barrier layer opposite of the substrate 104 and forming a sealing layer that seals the underlying substrate 104 from oxygen/steam exposure. Further, the diffusion behavior of the diffusive particles 110 may operate to seal any microcracks that could form in the barrier layer. Sealing the micro-cracks could prevent oxygen from infiltrating the barrier layer, which further enhances the oxidation resistance of the barrier layer. One example diffusive particle 110 is barium-magnesium alumino-silicate particles ("BMAS particles 110"), though other examples are contemplated.

In the example of FIG. 2, the barrier layer 102 is interfaced with the substrate 104. The CMAS-resistant component 114 is provided in a layer in that is disposed on the barrier layer 102. The CMAS-resistant component 114 is thus in the outermost layer of the component 100 so that it can react with CMAS deposits as discussed above. In this example, the CMAS-resistant layer 114 has a thickness that is approximately equal to or less than the thickness of the barrier layer 102.

Figure 3:
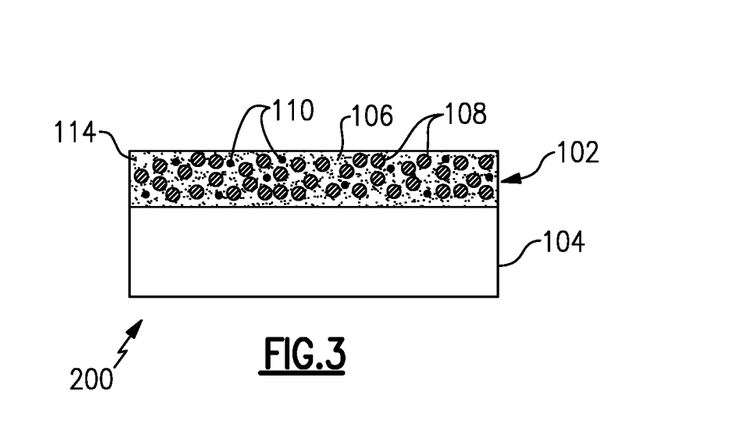
FIG. 3 illustrates another example article having a barrier layer and a CMAS-resistant component dispersed within the barrier layer.

FIG. 3 shows another example article 200 that includes the CMAS-resistant component 114 dispersed within the barrier layer 102. As in this example the barrier layer 102 is the outermost layer of the component 100, the CMAS-resistant component 114 is also effective to provide CMAS protection when dispersed within the matrix 106 along with the gettering particles 108 and the diffusive particles 110.

As noted above, the barrier layer 102 provides an oxygen and steam diffusion barrier to limit the exposure of the underlying substrate 104 to oxygen and/or steam from the surrounding environment. The barrier layer 102 can also, in some examples, have low thermal conductivity to provide some measure of thermal protection to the underlying substrate 104. Additionally, the barrier layer 102 has a coefficient of thermal expansion (CTE) that substantially matches with the underlying substrate 104 (which can be, in some examples, SiC or another ceramic material). CTE is defined as the fractional increase in volume in response to temperature change. Generally, the larger the CTE, the more the material will expand due to increased temperatures, and conversely, the smaller the CTE, the less the material will expand due to increased temperatures. A CTE mismatch between the substrate 104 and coatings such as the barrier layer 102 can induce thermal stresses between the substrate 104 and the coating (e.g., the component with the higher CTE tries to expand but is restricted by the lower CTE layer), and as a result, can compromise the structural integrity of the component, the coating, and/or their bond to one another. For example, delamination between layers of a coating or cracking of the coating could occur. Thus, the CTE for the barrier layer 102, the CMAS-resistant component 114, and the CTE for the substrate 104 substantially match. For example, components that have a substantial CTE match have a ratio of CTE that is between about 0.95 and about 1.6. In a further example, components that have a substantial CTE match have a ratio of CTE that is between about 0.95 and about 1.45.

Certain rare earth metals, and rare earth metal compounds such as rare earth hafnates and zirconates, are known to be reactive with CMAS to facilitate reactive crystallization by the formation of apatite crystals. For example, Gadolinium zirconates such as $Gd_2Zr_2O_7$ react with CMAS to form Gd-apatite crystals ($Ca_2Gd_8(SiO_4)_6O_2$). Lanthanum hafnates such as $La_2Hf_2O_7$ react with CMAS to form La-apatite crystals ($Ca_2La_8(SiO_4)_6O_2$). To that end, the CMAS-resistant component 114 includes a rare-earth hafnate. Generally, rare earth hafnates have a CTE significantly higher than that of many ceramics, including SiC and $SiO_2$, which could be used for the substrate 104 and the matrix of the barrier layer 102, respectively. Therefore, rare earth hafnates are typically not suitable for inclusion in the barrier layer 102 on their own, without CTE-mitigating components. However, hafnium silicate has a CTE that is lower than many ceramics, and thus mixtures of a rare earth hafnate and hafnium silicate have an effective CTE that substantially matches the CTE of the substrate 104 and/or barrier layer 102. In this way, the CMAS-resistant component 114 is suitable for use with the substrate 104 and barrier layer 102.

When in the presence of hafnium (or zirconium, which behaves similar to hafnium) and oxygen (e.g., hafnia, $HfO_2$), rare-earth hafnates exist in various phases that have varying levels of stability, with the relative stability influenced by the nature of the rare earth ion, the ratio of the amount of hafnium to the amount of rare earth metal, and the exposure temperature. At temperatures below about 1650° C., when low concentrations of rare earth ions are added to monoclinic hafnia, the ions dissolve into the monoclinic lattice to form a Hf+rare earth solid solution phase. For each rare earth element, a solubility limit exists (which may vary as a function of temperature) and if the amount of rare earth added exceeds the solubility limit, a second phase can form. In the case of smaller rare earth cations, such as gadolinium (Gd) and samarium (Sm) cations, the second phase is fluorite (a solid solution of rare earth and $HfO_2$ with a cubic crystal structure). In the case of larger rare earth cations such as Lanthanum (La), Praseodymium (Pr), and Neodymium (Nd) cations, when the concentration of rare earth exceeds the solubility limit of monoclinic hafnia, the second phase that is formed is pyrochlore, $RE_2Hf_2O_7$ (which is cubic phase, with an ordered arrangement of rare earth ions and oxygen vacancies within the Hf—O based lattice). The pyrochlore phase has a higher concentration of the rare earth element than the fluorite phase. Therefore, for two example compositions that have equal amounts of rare earth hafnates by mole percent, a composition having high concentration of the pyrochlore phase will have higher concentration of the rare-earth element than a composition having high concentration of the fluorite phase.

In general, the CMAS-resistant component 114 provides CMAS protection to the barrier layer 102/substrate 104 when it includes a concentration of a rare earth cations that is at least about 20 mole percent of all cations in the CMAS-resistant component 114. Said another way, the total number of rare earth cations divided by the total number of cations in the CMAS-resistant component 114 is at least about 0.2. For instance, for a CMAS-resistant component 114 that includes an La-hafnate and hafnium silicate, (number of La cations)/(number of La, Hf, and Si cations combined) is greater than or equal to 0.2. In some examples, the CMAS-resistant component can include up to about 50 mole percent rare earth element. In one example, in order to minimize the mole percent of rare earth hafnate in the CMAS-resistant component 114 while achieving a concentration of rare earth element suitable to provide CMAS protection, the CMAS-resistant component includes a rare earth hafnate that tends to favor the formation of the pyrochlore phase when combined in a mixture with hafnium silicate. Therefore, CTE mismatch with respect to the barrier layer 102/substrate 104, which is discussed above, can be minimized. In a particular example, the rare earth hafnate is an La hafnate, a Pr hafnate, or an Nd hafnate such as $La_2Hf_2O_7$, $Pr_2Hf_2O_7$, or $Nd_2Hf_2O_7$. $La_2Hf_2O_7$, $Pr_2Hf_2O_7$, and $Nd_2Hf_2O_7$ in the pyrochlore phase have good stability with hafnium silicate and in monoclinic hafnia.

In some examples, the rare earth hafnate and hafnium silicate are minority components (e.g., together comprise less than 50 mole percent of the CMAS-resistant component 114) of the CMAS-resistant component 114 and the majority component is monoclinic hafnia (e.g., monoclinic hafnia comprises more than 50 mole percent of the CMAS-resistant component 114). Monoclinic hafnia has a substantial CTE match with silicon carbide and most ceramics. In other examples, hafnium silicate is the majority component and monoclinic hafnia and the rare earth hafnate are minority components of the CMAS-resistant coating. In other examples, a rare-earth hafnate is the majority component.

The CMAS-resistant component 114 can also include additives that enhance the properties of the CMAS-resistant component 114. One example additive is a glass such a calcium alumina silicate ($CaO$—$Al_2O_3$—$SiO_2$, "CAS") glass. The addition of CAS glass can improve the density of the CMAS-resistant component, which can have mechanical benefits, and increase the reactivity of the CMAS-resistant component 114 with respect to CMAS, which can in turn enhance its CMAS resistance. When the component contains a CAS glass, the CMAS-resistant component may form a rare-earth apatite phase, $(Ca_2La_8(SiO_4)_6O_2$, alongside $HfO_2$, $HfSiO_4$, and/or the rare earth hafnate.

Figure 4:
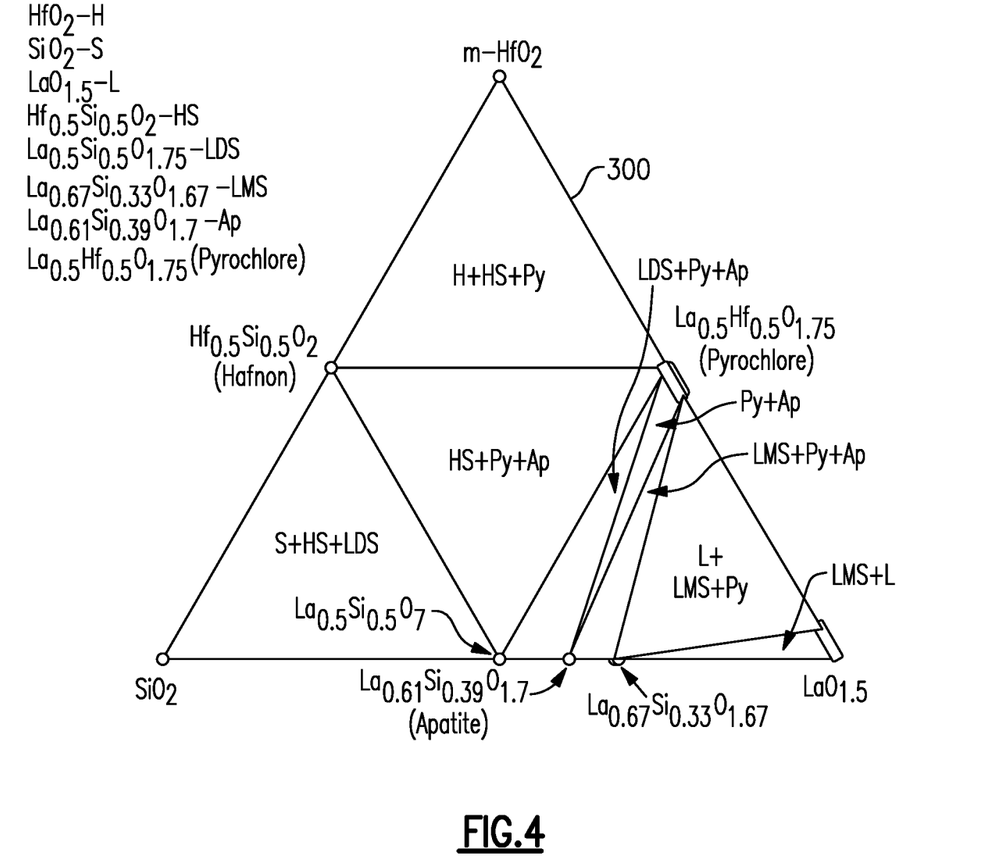
FIG. 4 illustrates a schematic phase diagram of a CMAS-resistant component.
Figure 5:
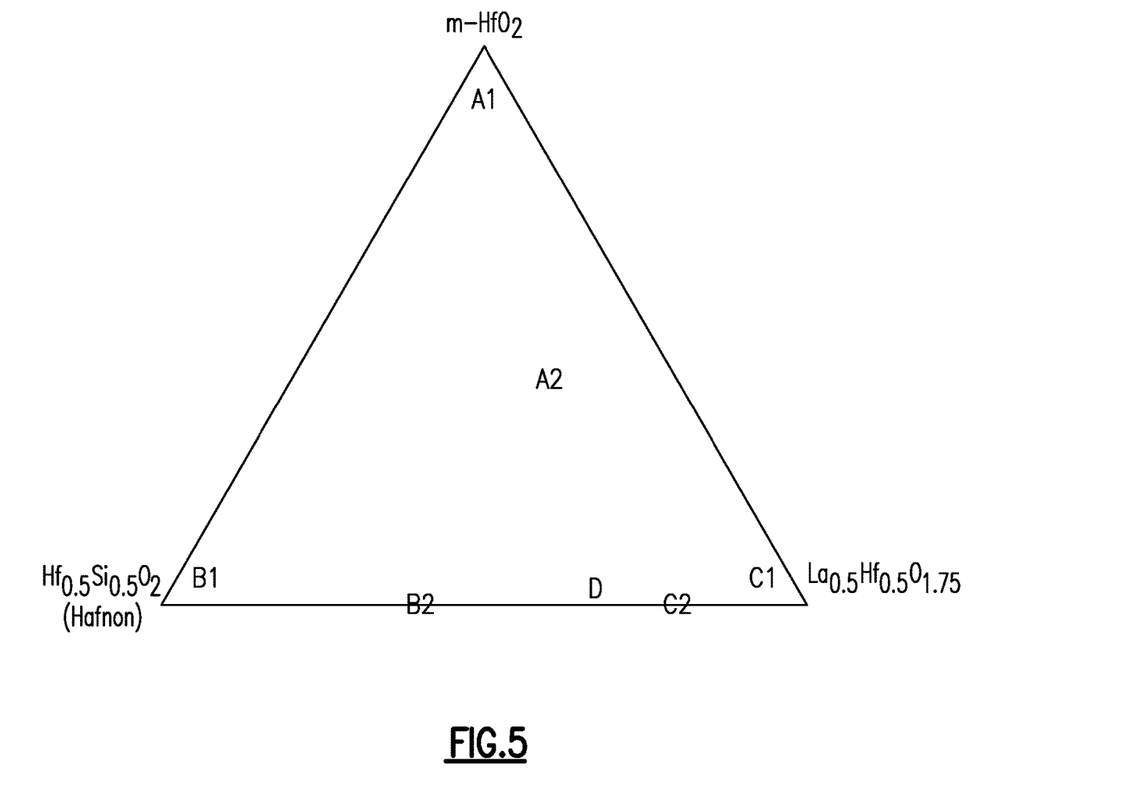
FIG. 5 illustrates a region of interest from FIG. 4.

FIGS. 4-5 schematically show a phase diagram for an example CMAS-resistant component 114 that includes monoclinic hafnia, hafnium silicate, and La-hafnate $La_2Hf_2O_7$.

Table 1 illustrates example CMAS-resistant compositions, which are also shown in FIG. 5.

| | Hafnium oxide $HfO_2$ | Hafnium silicate $Hf_{0.5}Si_{0.5}O_2$ Single cation mole % | La-hafnate $La_{0.5}Hf_{0.5}O_{1.75}$ |
|---|---|---|---|
| Example A1 | 90 | 5 | 5 |
| Example A2 | 40 | 20 | 40 |
| Example B1 | 5 | 90 | 5 |
| Example B2 | 0 | 60 | 40 |

-continued

| | Hafnium oxide $HfO_2$ | Hafnium silicate $Hf_{0.5}Si_{0.5}O_2$ Single cation mole % | La-hafnate $La_{0.5}Hf_{0.5}O_{1.75}$ |
|---|---|---|---|
| Example C1 | 5 | 5 | 90 |
| Example C2 | 0 | 20 | 80 |
| Example D | 3 | 31 | 66 |

Example A1 includes hafnium oxide as the majority component with hafnium silicate and La-hafnate. In this example, the CMAS-resistant component 114 includes between about 85 and about 95 single cation mole percent hafnium oxide ($HfO_2$), between about 5 and 15 single cation mole percent hafnium silicate ($Hf_{0.5}Si_{0.5}O_2$), and between about 5 and 15 single cation mole percent La-hafnate $La_{0.5}Hf_{0.5}O_{1.75}$. "Single cation mole percent" corresponds to mole percent for molecular formulas that are expressed with respect to a single cation in the molecule. Example A2 includes hafnium oxide as the majority component with hafnium silicate and La-hafnate. In this example, the CMAS-resistant component 114 includes between about 40 and about 45 single cation mole percent hafnium oxide ($HfO_2$), between about 15 and about 25 single cation mole percent hafnium silicate ($Hf_{0.5}Si_{0.5}O_2$), and between about 15 and about 25 single cation mole percent La-hafnate $La_{0.5}Hf_{0.5}O_{1.75}$. In examples A1 and A2, the minority components hafnium silicate and La-hafnate serve to pin grain boundaries in the monoclinic hafnia phase, which can contribute to minimizing microcracking.

Example B1 includes hafnium silicate as the majority component with hafnium oxide and La-hafnate. In this example, the CMAS-resistant component includes between about 85 and about 95 single cation mole percent hafnium silicate, between about 5 and about 15 single cation mole percent La-hafnate, and between about 5 and about 15 single cation mole percent hafnium oxide. Example B2 includes hafnium silicate as the majority component with hafnium oxide and La-hafnate. In this example, the CMAS-resistant component includes about 60 single cation mole percent hafnium silicate (+/−5 single cation mole percent), about 40 single cation mole percent La-hafnate (+/−5 single cation mole percent), and up to about 5 single cation mole percent hafnium oxide.

Example C1 includes La-hafnate as the majority component. In this example, the CMAS-resistant component includes between about 5 and about 15 single cation mole percent hafnium silicate, between about 85 and about 95 single cation mole percent La-hafnate, and between about 5 and 15 single cation mole percent hafnium oxide. Owing to the high La-hafnate content, the CTE of the composition of Example C1 may be relatively high compared to the CTE of Examples A1-A2 and Examples B1-B2. To accommodate the CTE mismatch with SiC, the microstructure of coating may be processed to impart compliance, either through porosity or the presence of vertical cracks (where "vertical" is normal to layer interfaces), as would be known in the art. Example C2 includes La-hafnate as the majority component. In this example, the CMAS-resistant component includes between about 15 and about 20 single cation mole percent hafnium silicate, about 80 single cation mole percent La-hafnate, and up to about 5 single cation mole percent hafnium oxide.

Example D includes La-hafnate as the majority component. In this example, the CMAS-resistant component includes about 31 single cation mole percent hafnium silicate, about 66 single cation mole percent La-hafnate, and about 3 single cation mole percent single cation hafnium oxide.

Certain of the examples discussed above include hafnium silicate as a minority component. These examples may exhibit improved vaporization resistance as compared to those examples that include significant amount of s silicon, as silicon-containing materials can be prone to vaporization in certain conditions. Still, even those examples with hafnium silicate as the majority component exhibit vaporization resistance that is suitable for the applications discussed above.

The barrier layer 102 and the CMAS-resistant component can be applied using any known method, but in some particular examples are applied using any known thermal spraying method. The environmental barrier layer can be applied such that the CMAS-resistant layer 114 is applied on top of the barrier layer 102 (as in FIG. 2) or such that the CMAS-resistant layer 114 is dispersed within the barrier layer 102 (as in FIG. 3). In one example method, powders of hafnon, La-hafnate (or another rare earth hafnate), and hafnia are mixed and then provided to a plasma spray torch, which deposits the barrier layer 102. In this method, the composition of the barrier layer 102 is controlled by the composition of the powder mixture. In another example method, separate feedstocks of hafnon, La-hafnate (or another rare earth hafnate), and hafnia are simultaneously but separately supplied to a plasma spray torch which deposits the barrier layer 102. In this method, the composition of the barrier layer 102 is controlled by the rate at which each feedstock is provided to the plasma spray torch.

Although the different examples are illustrated as having specific components, the examples of this disclosure are not limited to those particular combinations. It is possible to use some of the components or features from any of the embodiments in combination with features or components from any of the other embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An environmental barrier coating, comprising:
a barrier layer, the barrier layer including a matrix, diffusive particles, and gettering particles; and
a calcium-magnesia alumina-silicate (CMAS)-resistant component, wherein the CMAS-resistant component includes hafnium silicate and a rare earth hafnate, wherein the rare earth hafnate is La-hafnate, Nd-hafnate or Pr-hafnate.

2. The environmental barrier coating of claim 1, wherein the CMAS-resistant component includes a glass component.

3. The environmental barrier coating of claim 1, wherein the CMAS-resistant component includes at least 20 mole percent rare earth metal cations.

4. The environmental barrier coating of claim 1 wherein the rare earth hafnate is selected such that when the solubility limit of the rare earth hafnate in monoclinic hafnia is exceeded, a pyrochlore phase is formed.

5. The environmental barrier coating of claim 1, wherein the CMAS-resistant component further includes hafnia.

6. The environmental barrier coating of claim 5, wherein the CMAS-resistant component includes about 40 single cation mole percent hafnium oxide, about 20 single cation mole percent hafnium silicate, and about 40 single cation mole percent rare-earth hafnate.

7. The environmental barrier coating of claim 5, wherein the CMAS-resistant component includes between about 60 and about 90 single cation mole percent hafnium silicate, between about 5 and about 40 single cation mole percent rare-earth hafnate, and up to about 5 single cation mole percent hafnium oxide.

8. The environmental barrier coating of claim 5, wherein the CMAS-resistant component includes between about 5 and about 20 single cation mole percent hafnium silicate, between about 40 and about 90 single cation mole percent rare-earth hafnate, and up to about 5 single cation mole percent hafnium oxide.

9. The environmental barrier coating of claim 5, wherein the CMAS-resistant component includes about 31 single cation mole percent hafnium silicate, about 66 single cation mole percent rare-earth hafnate, and about 3 single cation mole percent hafnium oxide.

10. An article, comprising:
a substrate; and
a coating disposed on the substrate, the coating including
a barrier layer, the barrier layer including a matrix, diffusive particles, and gettering particles, and
a CMAS-resistant component, the CMAS-resistant component including a mixture of hafnium silicate and a rare-earth hafnate, wherein the CMAS-resistant component includes at least 20 mole percent rare earth hafnate, wherein the rare earth hafnate is La-hafnate, Nd-hafnate or Pr-hafnate.

11. The article of claim 10, wherein the substrate is a CMC-based material.

12. The article of claim 10, wherein a ratio of a coefficient of thermal expansion of the CMAS-resistant component and a coefficient of thermal expansion of the substrate is between about 0.95 to about 1.6.

13. The article of claim 10, wherein the CMAS-resistant component includes about 40 single cation mole percent hafnium oxide, about 20 single cation mole percent hafnium silicate, and about 40 single cation mole percent rare-earth hafnate.

14. The article of claim 10, wherein the CMAS-resistant component includes between about 60 and about 90 single cation mole percent hafnium silicate, between about 5 and about 40 single cation mole percent rare-earth hafnate, and up to about 5 single cation mole percent hafnium oxide.

15. The article of claim 10, wherein the CMAS-resistant component includes between about 5 and about 20 single cation mole percent hafnium silicate, between about 40 and about 90 single cation mole percent rare-earth hafnate, and up to about 5 single cation mole percent hafnium oxide.

16. A method of fabricating an article, comprising:
applying a barrier layer on a substrate, the barrier layer including a matrix, diffusive particles, gettering particles, and a CMAS-resistant component, the CMAS-resistant component including hafnium silicate and a rare earth hafnate, wherein the rare earth hafnate is La-hafnate, Nd-hafnate or Pr-hafnate.

17. The method of claim 16, wherein the applying is by thermal spray.

* * * * *